Nov. 10, 1970   E. B. WALLACE   3,538,671
BAGGING MACHINE

Filed March 11, 1968   5 Sheets-Sheet 1

INVENTOR.
EDWARD B. WALLACE
BY
Burd, MacEachron, Braddock,
Bartz & Schwartz
ATTORNEYS

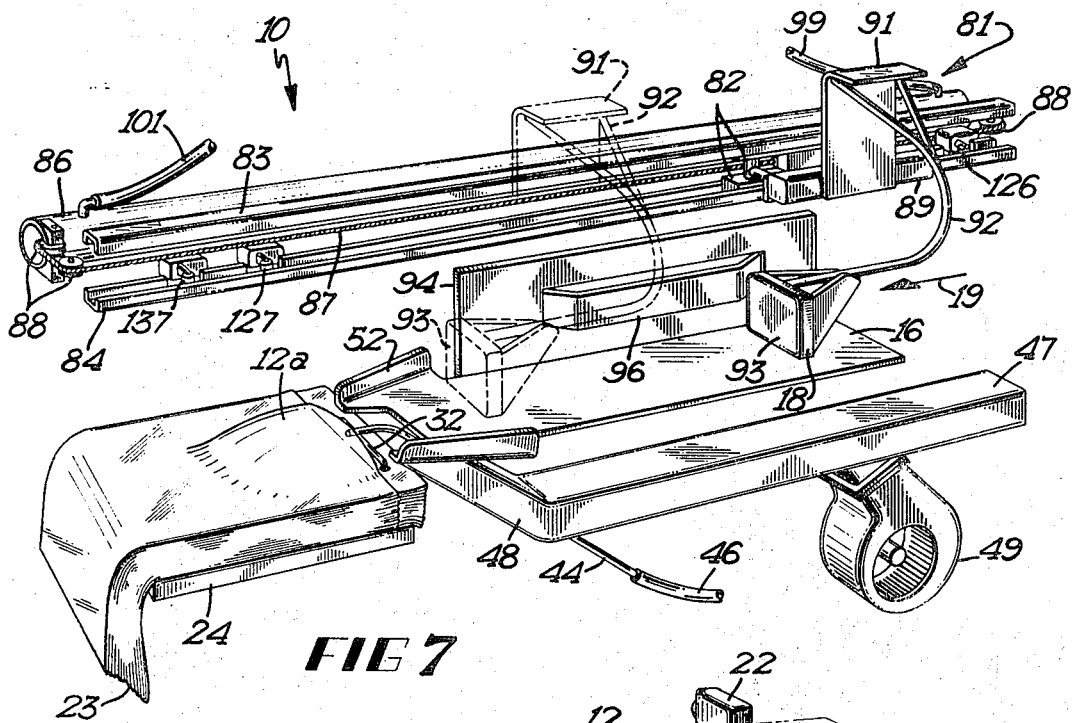
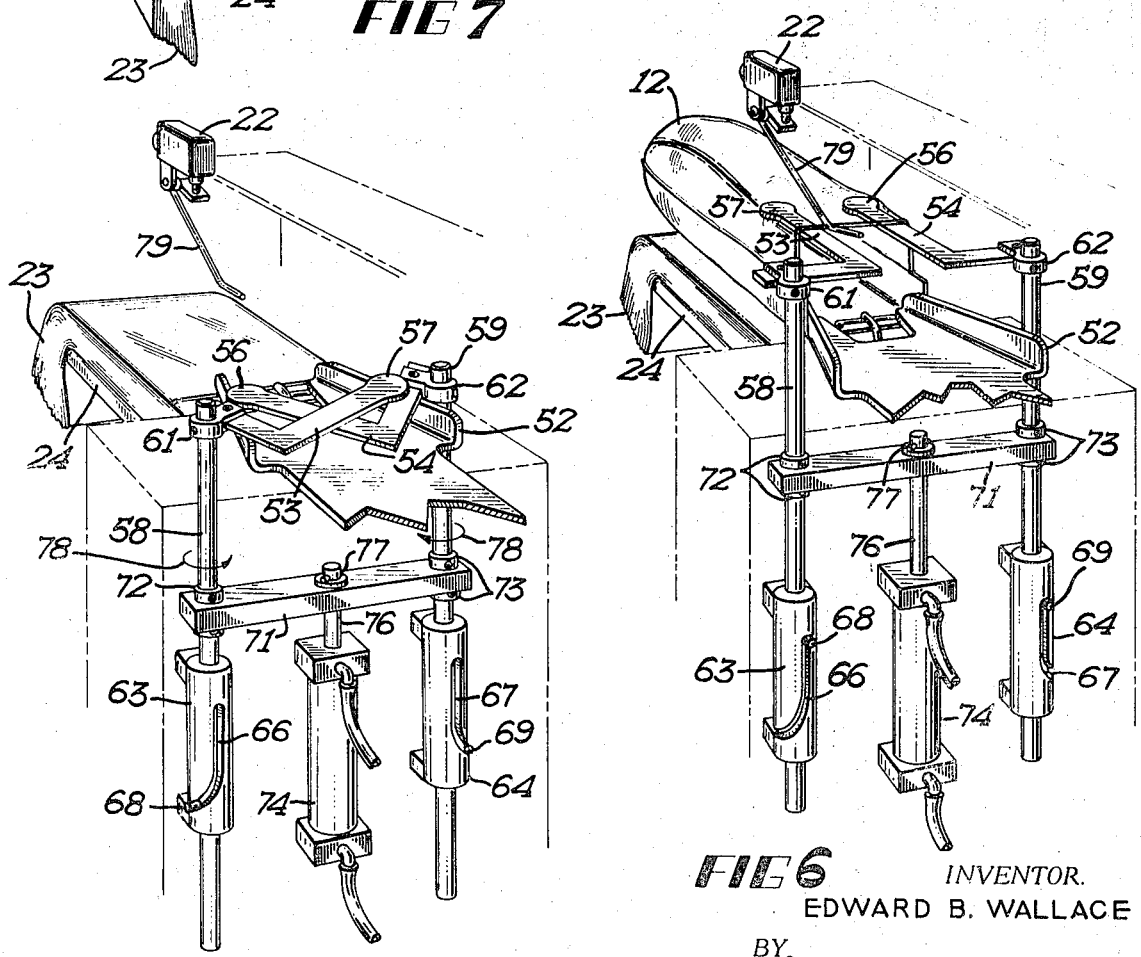

INVENTOR.
EDWARD B. WALLACE
BY
Burd, MacEachron, Braddock,
Bartz & Schwartz
ATTORNEYS United States Patent Office 3,538,671
Patented Nov. 10, 1970

3,538,671
BAGGING MACHINE
Edward B. Wallace, Minneapolis, Minn., assignor, by mesne assignments, to Hayssen Manufacturing Company, Sheboygan, Wis., a corporation of Delaware
Filed Mar. 11, 1968, Ser. No. 711,928
Int. Cl. B65b 5/06, 57/06, 43/36
U.S. Cl. 53—35                                    10 Claims

ABSTRACT OF THE DISCLOSURE

A polyethylene and similar plastic bag opening and holding structure for an automatic bagging machine. High pressure air is used to overcome the internal static electricity of the top bag in a stack on an elevator. Low pressure air inflates the bag fully. Mechanical compound action arms in conjunction with a loading chute and bag stack wicket open the bag mouth squarely and hold it securely while an object is being pushed into the bag. The object pusher releases the mechanical compound action arms so the object pusher pushes the bagged object off the stack of bags to make room for the next bag to be opened.

BACKGROUND OF THE INVENTION

The invention relates to automatic bagging with polyethylene and similar plastic bags which become highly charged with static electricity as they are prepared for use. This fact combined with the rather limp and slippery character of the films has made the bags hard to open and hold open squarely and securely while an object is being bagged. Also, prior automatic bagging machines claimed to handle plastic bags have been very expensive, unreliable, and cumbersome devices. My invention solves these problems.

SUMMARY OF INVENTION

The invention relates to a bagging machine operable to transfer an object, as bread, into an open bag of polyethylene or similar plastic film. The machine has a bag opening apparatus to automatically open the bag and hold the bag in the open position so that the object or article can be pushed into the bag. The bag opening apparatus has a first means for discharging a relatively high pressure stream of air at the mouth of the bag which overcomes the static charge tending to hold the bag closed. In this way the bag mouth is started at the entrance section of the bag. A second means discharges additional low pressure air into the now partially open entrance section to expand the entire bag. Coupled with the low pressure air are means for holding the mouth end of the bag in a wide open position. When the mouth end of the bag is thus fully opened and supported, a control is triggered which operates a pusher means for moving the object through the open mouth of the bag and into the bag.

The invention also contemplates a method of opening a bag for placing an object into the bag. Initially the entrance section of the bag is opened with a stream of air directed toward the mouth of the bag. After the entrance section is slightly opened, additional amounts of low pressure air are discharged into the bag to expand the entire bag to hold the bag in an expanded position. The entrance section of the bag is held open and anchored mechanically. With the bag in this position the object is moved into the bag. During the final stages of insertion of the object into the bag, the bag is released so that it can be moved to a discharge location.

Figure 1:
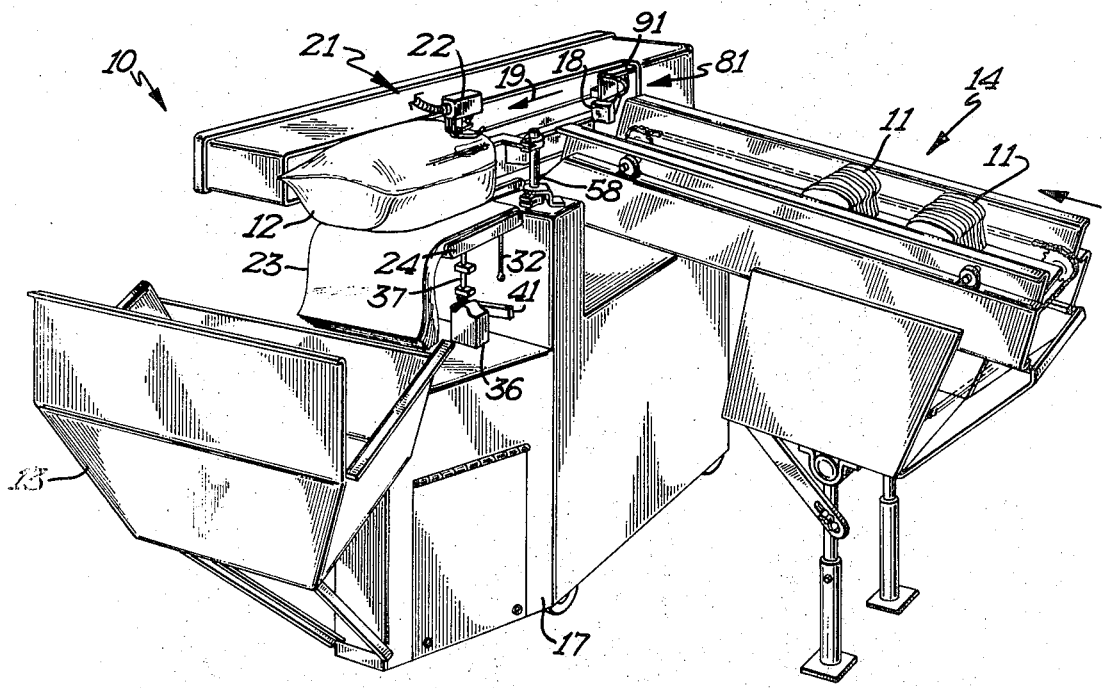
Figure 2:
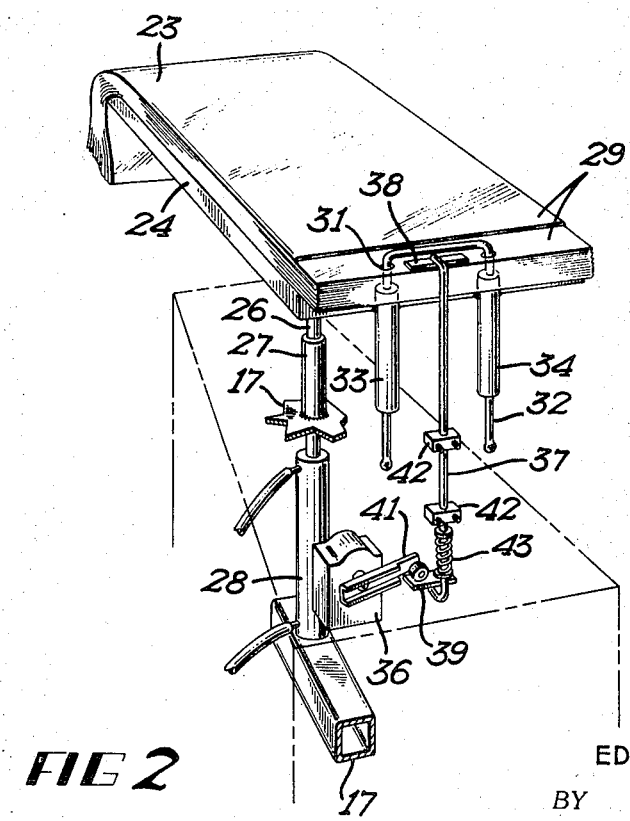
Figure 3:
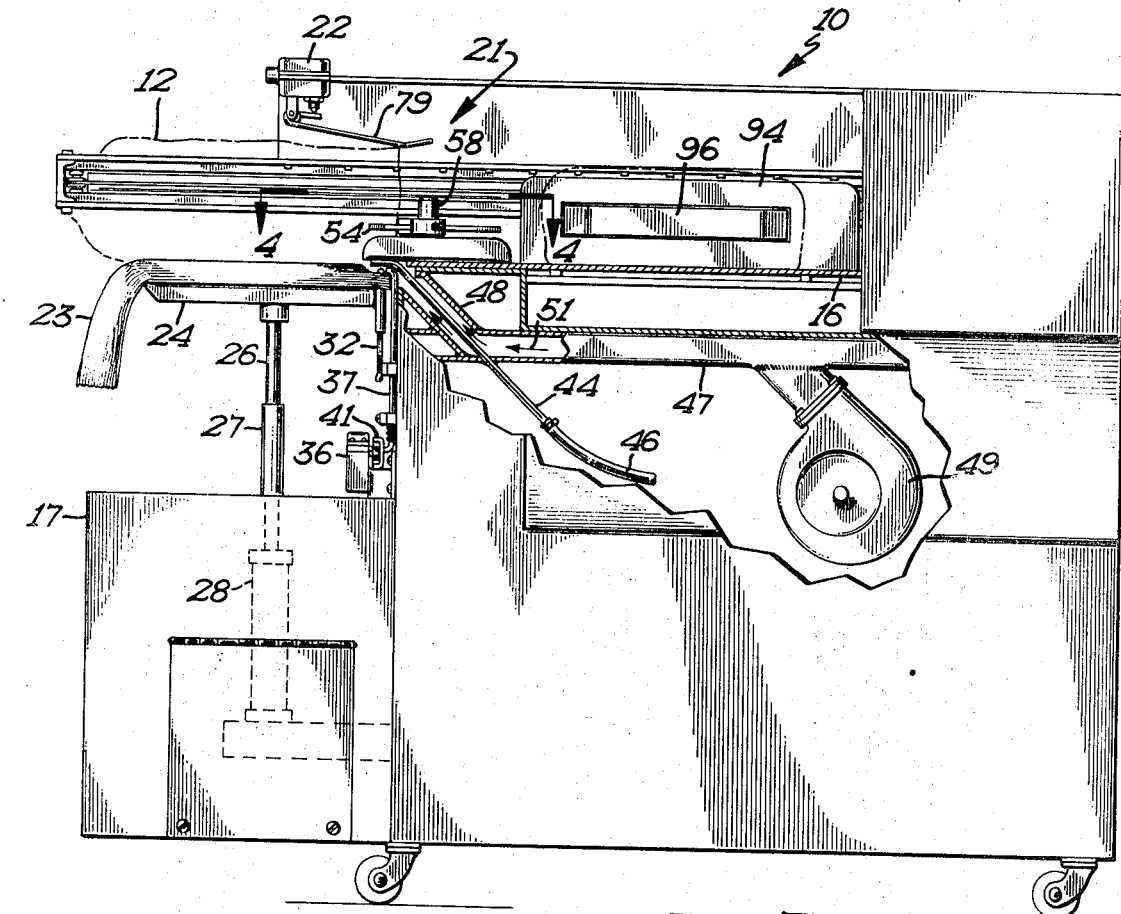
Figure 4:
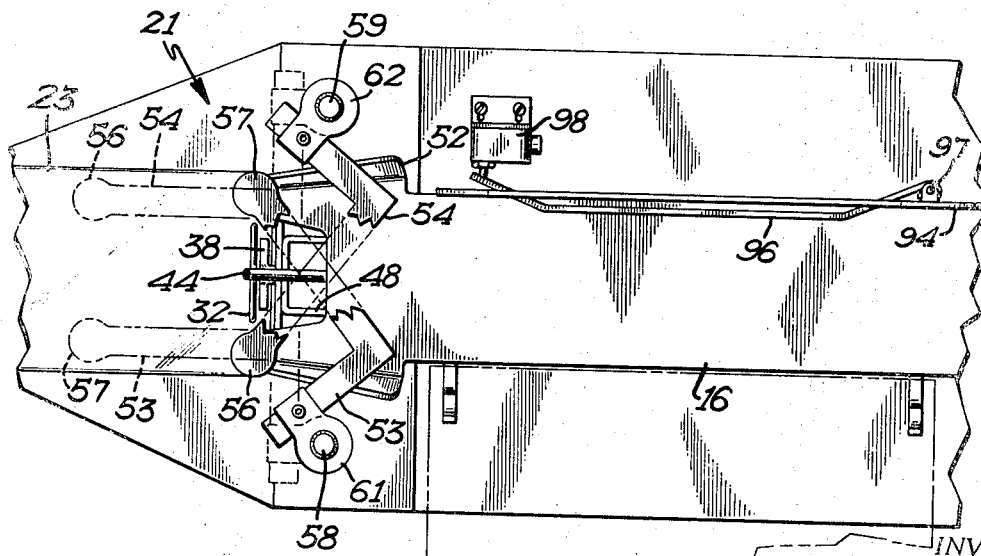
Figure 8:
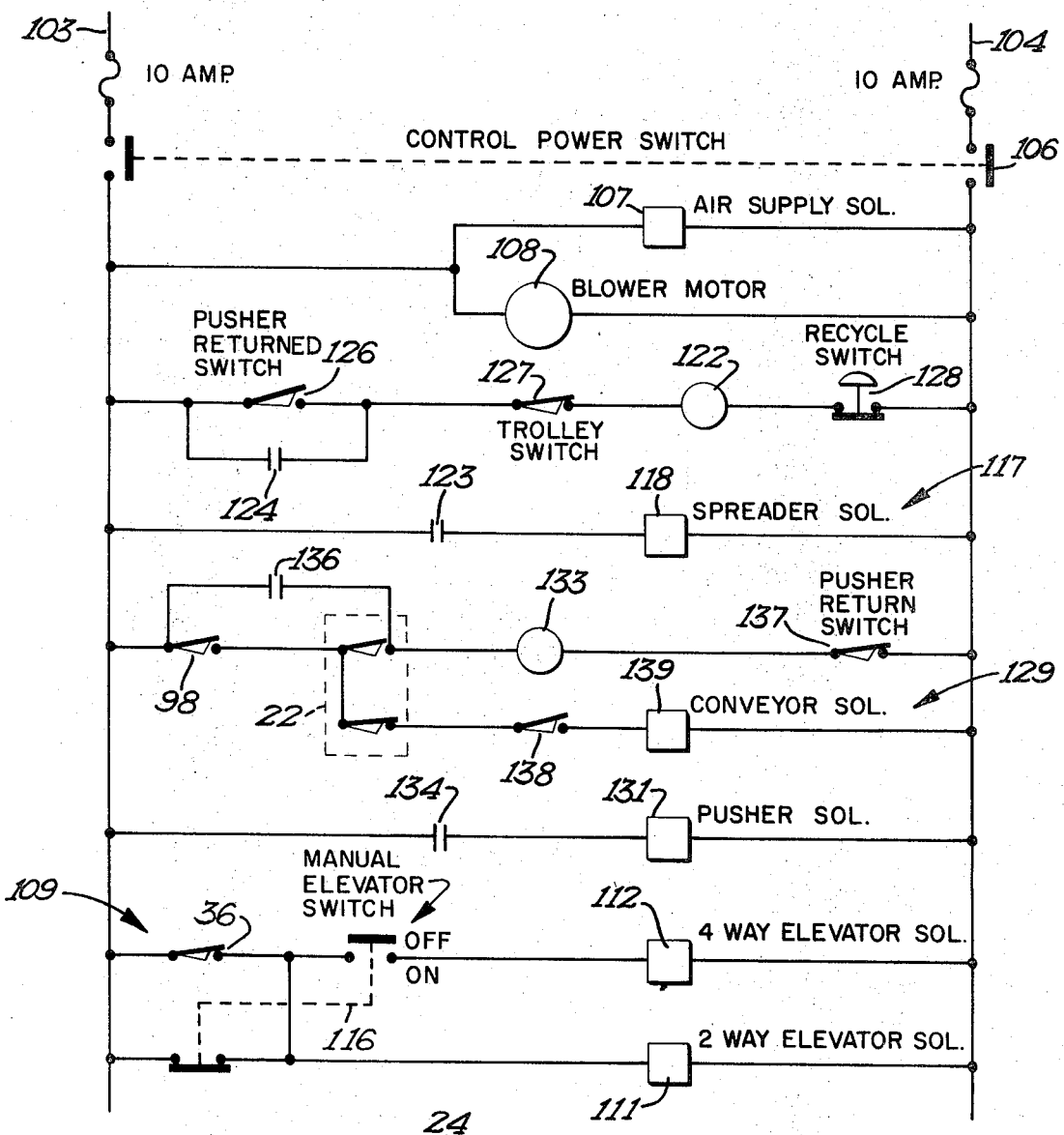
Figure 9:
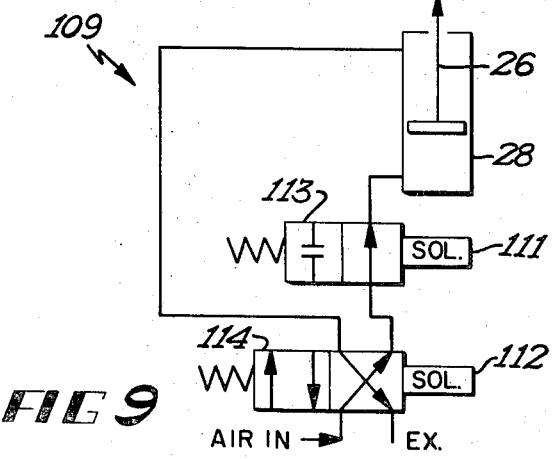
Figure 10:
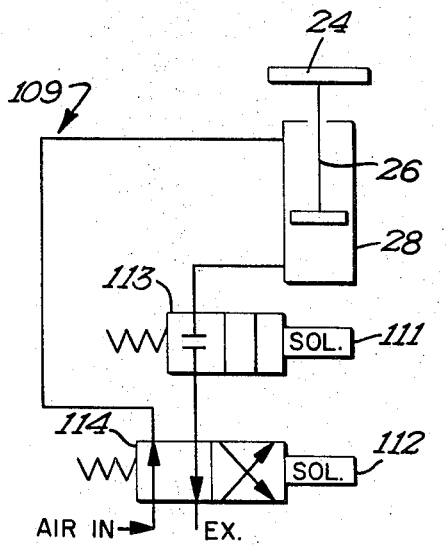
Figure 11:
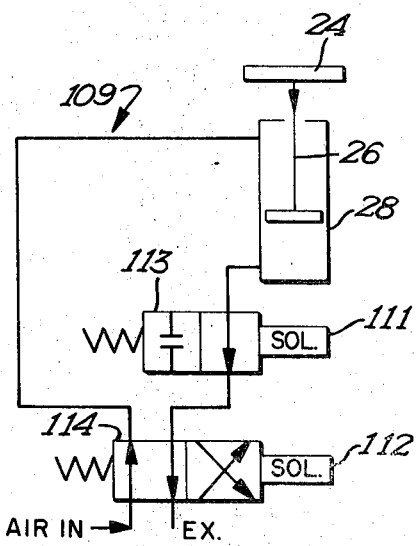
Figure 13:
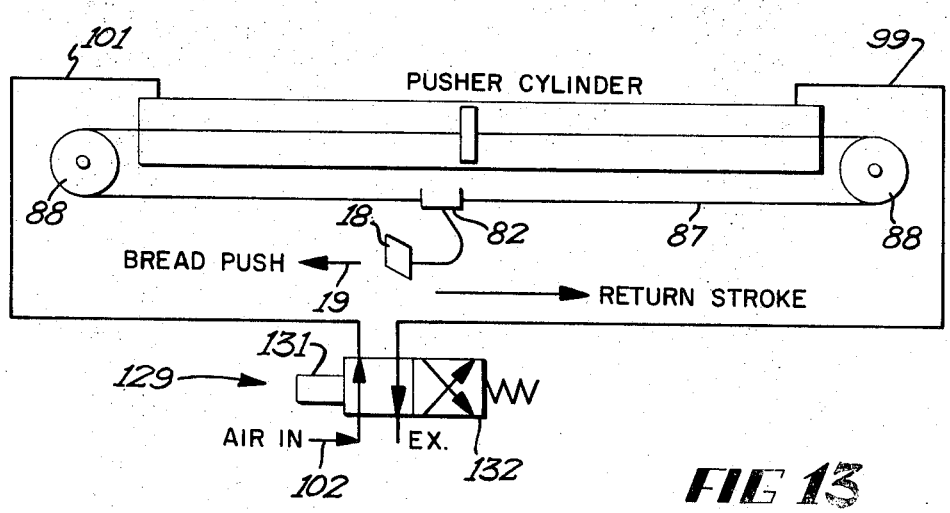
Figure 12:
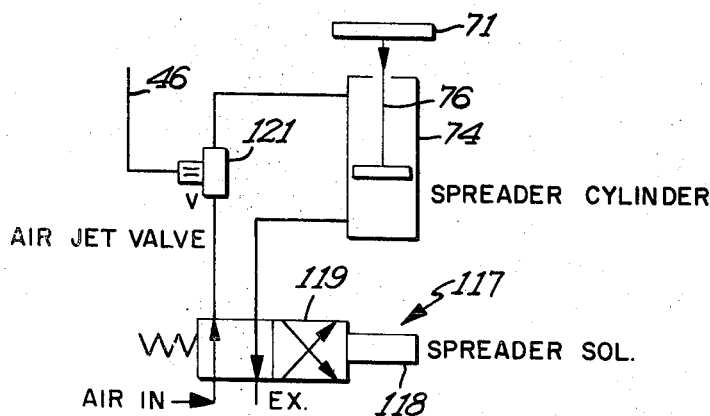

In the drawings:
FIG. 1, is a perspective view of the bagging machine of the invention;
FIG. 2 is a perspective view of the bag support;
FIG. 3 is a side view partly sectional of the bagging machine of FIG. 1;
FIG. 4 is a plan view of the bag opening apparatus of the bagging machine of FIG. 1;
FIG. 5 is a perspective view of the bag opening apparatus opening a bag;
FIG. 6 is a view similar to FIG. 5 showing the bag opening apparatus holding an open bag;
FIG. 7 is a perspective view of the bread transfer assembly;
FIG. 8 is a diagrammatic view of the control system of the bagging machine;
FIGS. 9, 10 and 11 are diagrammatic views of the control system for the bag elevator;
FIG. 12 is a diagrammatic view of the control system for the spreader arms of the bag opening apparatus; and
FIG. 13 is a diagrammatic view of the pusher and conveyor control.

Referring to the drawings there is shown in FIG. 1 the bagging machine of this invention indicated generally at 10 operable to automatically place an object 11, here shown as a sliced loaf of bread, into a bag 12. The bag 12 is shown as a flexible polyethylene or similar plastic film bag. After the bread is placed in the bag, the bagged bread is deposited into a discharge bin 13 located adjacent the end of the machine.

Located adjacent one side of the machine 10 is an infeed conveyor 14 for receiving the sliced bread from a bread slicing machine and transporting the sliced bread onto a loading or feeder table 16 secured to a frame 17 of the machine. Table 16 is forward of and horizontally aligned with the open bag 12. A pusher 18 contacts the rear end of the bread and transports the bread into the open bag 12 in the direction indicated by arrow 19.

The bags are stored in a flat collapsed position, as received from the maker or printer, and are sequentially opened with a bag opening apparatus indicated generally at 21. When the bag is held squarely open it engages a sensor unit 22 which controls the next step in the sequential operation of the machine.

As shown in FIG. 2, the machine 10 has a supply of stacked, flat bags 23 resting on an elevator or vertically movable platform 24. The platform 24 automatically moves in an upward direction as the supply of bags decreases to maintain the top bag in substantial alignment with the top surface of the feeder table 16. An upright support 26 secured to the lower side of platform 24 extends through an upright guide 27 secured to the frame 17. The lower end of support 26 is attached to the piston rod of a fluid cylinder 28 mounted on frame 17. Fluid cylinder 28 is a double acting air cylinder operable to raise and lower the platform 24.

The stack of bags 23 retained on the platform 24 have an entrance section 29 with a long bottom flap formed with a pair of holes 31. An inverted U-shaped member 32, known in the trade as a wicket, projects through the holes 31 into downwardly extended tubular guides 33 and 34 secured to the bottom of the platform 24. The base of the U-shaped member 33 holds the bottom side of the top bag in a generally flat position.

The fluid cylinder 28 is automatically operated by means of a switch 36 electrically connected to fluid control valves 111 and 112. Located adjacent switch 36 is an upright sensor rod 37 having a transverse head 38 engageable with the top of the entrance section of the bags. Secured to the lower end of rod 37 is a foot 39 which supports the outer end of an arm 41 connected to the switching element of switch 36. The rod 37 is mounted for movement in a vertical direction in a pair of support blocks 42 secured to the frame of the machine. A spring 43 on the lower section of rod 37 biases the rod 37 in a downward direction to keep a constant force on the bag flaps 29. As the stack of bags 23 is used, the spring 43 forces the rod 37 in a downward direction. The arm 41 will follow the foot 39 and actuate the switch 36 when the head 38 approaches the platform 24. The switch 36 activates the valves controlling the flow of air to the cylinder 28 to raise the platform 24. As the platform 24 is raised the foot 39 carries the arm 41 in an upward direction disengaging the switch 36 with the result that the valves controlling the cylinder 28 will trap the fluid in the cylinder thereby holding the platform 24 in its elevated position.

Bag opening apparatus 21 is operable to automatically inflate the top bag of the stack of bags 23 on platform 24 and hold the bag open for the reception of the bread moved by pusher 18. As shown in FIGS. 3 and 7, bag opening apparatus 21 has a forwardly directed nozzle 44 discharging air over the top of the wicket 32 used to hold the bottom flap of the bag on the platform 24. The nozzle 44 is connected to a hose 46 used to conduct air under high pressure to the nozzle. The air is under sufficient pressure, between 80 and 90 pounds, to overcome the static electricity tending to hold the plastic bag closed. While static electricity on the outside of the bags can be discharged, as of this writing no practical way to bleed off the internal charge has been found.

As shown in FIGS. 5 and 7, the air discharged from nozzle 44 initially opens the mouth end of the bag indicated at 12A. The bag is expanded to the full open position and held in this position by additional air transported to the mouth end of the bag through the tubular frame 47 having an upright discharge section 48 aligned with the nozzle 44. A blower 49 operates to supply a continuous flow of air indicated by arrows 51 through the tubular frame 47 and into the opened bag. Located above the frame section 48 and in alignment with the feeder table 16 is a converging trough or chute 52 aligned with the open mouth end of the bag to guide the bread into the opened bag.

As shown in FIGS. 4, 5 and 6, a pair of movable arms 53 and 54 cooperate with the wicket and air to hold the mouth of the bag open. The forward ends of the arms have enlarged rounded ends 56 and 57 respectively which engage the opposite side sections of the bag to hold the mouth end of the bag in a generally rectangular shape so that the bread can move into the bag. The opposite ends are located adjacent upright control rods 58 and 59 and are secured to the control rods by adjustment couplings 61 and 62 respectively. Rods 58 and 59 extend in downward directions and through cylindrical control guides 63 and 64 secured to the frame. The guides have curved slots or cam ways 66 and 67 which cooperate with lateral projections or followers 68 and 69 secured to the rods whereby the rods are rotated as they move in an up and down direction to provide compound movement of the arms 53 and 54.

Midportions of the rods 58 and 59 are connected with a crossbar 71. Pairs of collars 72 and 73 on the rods 58 and 59 engage opposite sides of the crossbar to limit the axial movement of the crossbar relative to the rods. Located below the midportion of the crossbar 71 is an upright fluid cylinder 74 and an upwardly projected piston rod 76. The upper end of the piston rod 76 projects through the cross bar 71 and carries a fastener 77, such a cotter pin, to connect the fluid motor to the crossbar.

As shown in FIG. 5, the fluid motor 74 is in a contracted position with the rods 58 and 59 lowered. In this position the arms 53 and 54 are in out-crossed locations as the followers 68 and 69 follew the curves of the slots 66 and 67. The arms as shown in full lines in FIG. 4 are also lowered adjacent the top of the trough 52 locating the heads 56 and 57 close to the entrance opening of the bag 12. With the mouth end of the bag opened by air flowing through nozzle 44 and discharge section 48, arms 53 and 54 move upwardly and swing away from each other to the dotted line position shown in FIG. 4.

The movement of the arms is achieved by expanding cylinder 74 with air causing control rods 58 and 59 to move in an upward direction. The followers 68 and 69 slide along the slots 66 and 67 rotating the rods 58 and 59 in the direction of arrows 78, as shown in FIG. 5. In the raised position, as shown in FIG. 6, the arms extend in longitudinal directions and hold the top portion of the mouth of the bag 12 open. The wicket 32 holds the lower flap of the bag on the stack of bags.

When the bag is held squarely open, the top portion of the bag engages a lever or feeler 79 of the sensor switch unit 22 to activate the sensor unit to signal the controls of the machine that a bag is ready to receive bread. As the bread reaches the end of the bag, the trolley switch 127 will signal the controls to retract the air cylinder 74 whereby the arms move to their lowered cross positions as shown in FIG. 4; whereby the bag is released and is pushed off the stack of bags by the final movement of pusher 18.

Referring to FIG. 7, the transfer apparatus of the machine 10 indicated generally at 81 is operable to move the bread discharged onto the table 16 by the infeed conveyor 14 in the direction of arrow 19 into the open bag. The transfer apparatus 81 includes the pusher 18 and a carriage 82 movable along a linear path. The carriage 82 rides in upper and lower channel rails 83 and 84 secured to frame 17. An elongated fluid cylinder 86 having a piston (not shown) attached to a cable 87 secured to the carriage 82 is used to reciprocate the carriage along the rails 83 and 84. An air supply hose 99 is coupled to the rear end of the cylinder 86. A similar air supply hose 101 is connected to the opposite end of cylinder 86. The cable 87 is trained over pulleys 88 at opposite ends of the cylinder 86 to change the direction of the cable in the usual manner. Secured to the side of the carriage 82 is a longitudinal block 89 carrying an upright support 91. The top portion of the support 91 extends in an outward direction and carries a curved arm 92. Pusher 18 is secured to the forward portion of the arm 92. Arm 92 holds the flat face 93 of the pusher in an upright position slightly above the feeder table 16 and adjacent an upright back wall 94 adjustably mounted on the table 16.

The wall 94 has an elongated longitudinal slot receiving a lever 96. As shown in FIG. 3, one end of the lever 96 is pivoted with an upright pivot pin 97 to back wall 94. The opposite end of the lever extends through the slot and engages a switch 98 which controls the operation of the cylinder 86.

Referring to FIG. 8, there is shown a power diagram for the bagging machine 10. The circuit includes power line 103 and a ground or neutral line 104. A master control switch 106 is used to energize the circuit. With the switch 106 closed an air supply solenoid 107 is energized connecting the main air supply to control cylinders to control cylinders 28, 74 and 86 as well as an air clutch for a motor driving the infeed conveyor 14. If a proper electrical sequence has not been made, the conveyor will stop automatically to keep the bread to be bagged from piling up.

The electrical valve control system for elevator 24 is shown in FIGS. 8 to 11 and indicated generally by the number 109. The system 109 has a pair of solenoids 111 and 112 connected to the position control switch 36 and to the lines 103 and 104. As shown in FIG. 8, when the platform 24 is in its normal elevated position, switch 36 is in the OFF position. When the platform is to be raised, the switch 36 is moved to the ON position by the lowering of the sensor rod 37. As shown in FIGS. 9 to 11, the solenoid 111 operates a two-way air valve 113 normally biased to a closed position as shown in FIG. 10. Solenoid 112 operates four-way air valve 114 which is moved to a position which is biased to supply air to the top of cylinder 28 and exhausts air from the bottom of cylinder 28. Returning to FIG. 8, one side of manual two pole switch 116 is connected to line 103 and to solenoid 111 to bypass the switch 36 when switch 116 is OFF. FIG. 11 shows the solenoid 111 energized to exhaust air from the bottom of cylinder 26 while de-energizing valve 114 supplies air to the top of cylinder 28 lowering table 16. This is accomplished by turning OFF elevator switch 116.

In operation, a stack of bags 23 is placed on the elevator 24 and secured to the elevator with the U-shaped wicket member 32. The head 38 of the sensor rod 37 is placed against the top of the flaps at the forward ends of the bags to sense the location of the bags relative to the feeder table 16 and switch 116 turned ON. If the top bag is below the required level for feeder table 16 switch 36 will be in the closed, ON position energizing both solenoids 111 and 112. The solenoids move the air valves 113 and 114 so that air is supplied to the bottom of cylinder 28 and exhausted from the top of cylinder as shown in FIG. 9. When elevator 24 has reached the required height switch 36 is moved to the open position thereby de-energizing both solenoids 111 and 112. Air valve 113 moves to a block or stop position as shown in FIG. 10 thereby trapping the fluid in the bottom of cylinder 28. The air in the top of cylinder 28 is under pressure from the air supply.

To lower elevator 24, switch 116 is turned OFF thereby energizing the solenoid 111 only, as shown in FIG. 11. This moves the air valve 113 to the open position connecting the bottom of cylinder 28 to the exhaust port of air valve 114. The air supplied to the top of cylinder 28 drives the elevator 24 in a downward direction.

The movement of spreader arms 53 and 54 is controlled by an electrical valve spreader control indicated generally at 117 in FIGS. 8 and 12. Control 117 has a solenoid 118 controlling a four-way air valve 119 operable to selectively supply air and exhaust air from opposite ends of cylinder 74. When solenoid 118 is energized by pusher returned switch 126, air is supplied to the bottom of cylinder 74 raising crossbar 71 whereby arms 53 and 54 are moved to their bag holding positions as shown in FIG. 6. Solenoid 118 is de-energized by switch 127 engaged by the pusher; valve 119 moves to its normal position as shown in FIG. 12 wherein air in the bottom of cylinder 74 is exhausted and air is supplied to the top of the cylinder 74.

Concurrently with the supplying of air to the top of cylinder 74, part of the air under pressure is directed to the line 46 connected to the jet nozzle 44. An air jet valve 121 in the line connecting cylinder 74 to valve 119 directs air under high pressure to the line 46.

Returning to FIG. 8, energization of solenoid 118 is controlled by a control relay 122 having contacts 123 operable to connect the solenoid 118 to lines 103 and 104. Control relay 122 has additional contacts 124 which close to bypass a pusher returned switch 126. The trolley switch 127 is interposed in a line between the control relay 122 and switch 126. A recycle switch 128 is in the line between the control relay 122 and the line 104. When the pusher 18 transfers the bread into the bag and before the bread reaches the end of the bag trolley switch 127 is opened, de-energizing control relay 122. This de-energizes solenoid 118 so that valve 119 moves to return position as shown in FIG. 12. The air from the bottom of cylinder 74 is exhausted and is supplied to the top of cylinder 74 driving the crossbar 71 downwardly and arms move back to their fold-down position as shown in full lines in FIG. 4. If hand operated recycle switch 128 is moved to the open position, control relay 122 will be de-energized and move the spreader arms to their initial fold position as when sensing device 22 is not engaged.

Coordinated operation of the pusher and conveyor is controlled by pusher and conveyor control indicated generally at 129. As shown in FIG. 13, control 129 has a solenoid 131 operating a four-way air valve 132 connected to the opposite ends of the pusher cylinder 86 by suitable lines 99 and 101. As shown in FIG. 8, a second relay 133 is interposed in a line between the sensor unit 22 and the line 104. The control relay 133 has first contacts 134 connecting the solenoid 131 to the line 103 and switch 22. Interposed in a line between the control relay 133 and line 104 is a pusher return switch 137. Conveyor control switch 138 is connected in a line between the bag sensing switch 22 and the conveyor solenoid 139. Solenoid 139 operates an air valve (not shown) to control the flow of air to an air controlled clutch used in the drive of the infeed conveyor 14. When the solenoid 139 is energized, the air is supplied to the air clutch to effect a drive for the conveyor shaft. This controls the flow of bread onto the feeder table 16.

With a bag in its expanded open position as shown in FIG. 6, the bag sensing switch 22 is closed. When the carriage 82 is located in its initial position, shown in full lines in FIG. 7, the pusher returned switch 126 is closed thereby energizing the control relay 122. This energizes the spreader solenoid 118 with the result that the spreader arms move to their bag opening positions. When the bread is moved onto the feeder table 16 from the infeed conveyor 14 it strikes the lever 96 closing the bread switch 98. This energizes the control relay 133 with the result that the contacts 134 are closed energizing the pusher solenoid 131. The air flows into the pusher cylinder 86 driving the pusher in the direction of the arrow 19, as shown in FIG. 7, to transport the bread into the opened bag. The contacts 136 bypass the bread switch 98 and bag sensing switch 22 with the result that the pusher solenoid 131 remains energized as the control relay 133 is not de-energized. As soon as the bag sensing switch 22 opens the conveyor solenoid 139 is de-energized with the result that the infeed conveyor 14 is stopped to prevent the piling or accumulation of bread against the pusher arm. As the carriage strikes the switch 127 it opens the switch de-energizing the control relay 122 and opening contacts 123 with the result that the spreader solenoid 118 is de-energized starting the movement of the arms 53 and 54 to their initial crossed positions to release the bag so it can be pushed into the bin. When the carriage strikes the pusher return switch 137, the control relay 133 is de-energized opening contacts 134 and 136. This causes the pusher solenoid 131 to reverse the valve 132 changing the direction of movement of the pusher 18 to return it to its initial position.

In terms of a method of sequentially opening stacked polyethylene and similar plastic film bags and placing objects, as bread, into the open bags, the invention comprises the steps of initially opening the entrance section of the top of the bag on top of the stack with a stream of high pressure air directed toward the mouth of the bag. This is done by holding the bottom flap of the bag and directing the jet of air longitudinally into the bag. The entire bag is expanded by discharging additional amounts of air into the open entrance section of the bag. The entrance section of the bag is held wide open by a pair of arms 53 and 54 which move upwardly and swing to substantially parallel longitudinal positions. The movement of the arms is concurrent with the opening of the bag and maintains the open end of the bag in alignment with a pusher 18 used to transport the bread from a feeder table 16 to the open bag.

An infeed conveyor 14 sequentially places the bread on the feeder table 16 forwardly of the pusher 18. Linear movement of the pusher 18 slides the bread into the opened bag. Before the bread reaches the closed end of the bag, the holding arms 53 and 54 are released and move toward each other and downwardly back to their initial folded position. At the same time, the downward stroke of the control cylinder for the arms operates in conjunction with the air jet discharging nozzle 44 to open the mouth section of the next bag. The pusher 18 releases the bag from the U-shaped holding wicket 32 by tearing the bag in the areas adjacent the holes 31.

As the pusher 18 returns to its initial position, it strikes switch 126 which starts the infeed conveyor to feed a second loaf of bread onto the feeder table 16. The bread closes the switch 98 to commence a second bagging operation. The operation will continue if the bag sensing switch is closed indicating that the bag is ready to receive the bread.

While there have been shown and described a preferred embodiment of a machine and a method of opening a plastic film bag and placing bread into the bag, it is to be understood that various changes, additions and variations may be made by those skilled in the art without departing from the spirit of the invention. The invention has been described with bread as the article being bagged. This machine and method of the invention is usable to bag other articles or materials. The invention is defined in the terms of the following claims.

The embodiments of the invention in which an exclusive property or privilege is claimed are defined as follows:

1. A machine for opening a bag and moving an article into the bag through the open mouth of the bag comprising first means for directing moving air toward the mouth of a bag to open and expend the bag, mechanical means for holding the mouth of the bag in an open position, and means for moving an article into the bag through the open mouth, said mechanical means comprising a pair of arms movable into the mouth of the bag to hold the mouth of the bag open squarely, the ends of the arms comprising members including rounded bulges facing toward the bag sides when said pair of arms is moved into the mouth of an open bag, whereby the bulges stretch a portion of the bag side beyond the line formed by the edge of the arm adjacent thereto to more securely hold the bag while an object is being moved through the open mouth of the bag into the bag.

2. A machine for opening a bag and moving an article into the bag through the open mouth of the bag, comprising first means for directing moving air toward the mouth of a bag to open and expand the bag, mechanical means for holding the mouth of the bag in an open position, and means for moving an article into the bag through the open mouth, said mechanical means comprising a pair of arms movable into the mouth of the bag to hold the mouth of the bag open squarely, and control means for the arms mounting the arms for concurrent rotational and vertical movement, and fluid cylinder means connected to the control means operable to selectively raise and lower the control means to raise and move the arms into the mouth of the bag and to lower and move the arms out of the mouth of the bag.

3. The machine of claim 2 wherein the first means comprise nozzle means positioned to direct a stream of air toward the mouth end of the bag and air valve means connected to the nozzle means and fluid cylinder means to direct air to the nozzle means when the fluid cylinder means lowers the control means.

4. A machine for opening a bag and moving an article into the bag through the open mouth of the bag comprising first means for directing moving air toward the mouth of a bag to open and expand the bag, mechanical means for holding the mouth of the bag in an open position, pusher means for moving an article into the bag through the open mouth, and a bag mouth top sensing unit operable in response to a bag mouth top that has been opened squarely and completely to control the movement of the pusher means for moving an article into the bag.

5. The machine of claim 4 including an article sensing switch operable on engagement with an article in conjunction with the bag sensing unit to actuate the means to move the article into the bag.

6. A method of opening a bag having a bottom and placing an article into the bag comprising: discharging air at two disparate pressures toward the entrance section of the bag to both open and expand the entire bag, mechanically holding the entrance section of the bag open squarely, moving the article into the bag and releasing the mechanical holding of the bag for movement to a discharge location before movement of the article toward the bottom of the bag is completed.

7. The method of claim 6 wherein: the entrance section of the bag is initially opened with a stream of high pressure air directed toward the mouth of the bag and additional low presure air is used to expand the entire bag.

8. The method of claim 6 including: using the bag entrance portion to signal that the bag is open.

9. The method of claim 6 including; providing a stack of bags and elevating the stack of bags to align the top of the stack of bags with the air discharged toward the entrance section of the bags.

10. Apparatus for bagging items such as loaves of bread comprising a table, means for holding a stack of open-mouthed bags at one end of the table with the mouths of the bags toward said end of the table and the top bag at the level of the table, means for directing air toward the mouth if the top bag of the stack to open the bag, means movable into the top bag after it has been opened to hold it open, a pusher movable forward over the table from a retracted position to push an item endwise along the table into the top bag of the stack after it has been opened and movable back to retracted position, a conveyor for conveying items one after another in lateral direction onto the table to a position in front of the pusher, means responsive to return of the pusher to retracted position for operating the conveyor to deliver an item into position in front of the pusher and to operate said holding means, and means responsive to opening of the bag and the item arriving at the position in front of the pusher for effecting forward movement of the pusher to push the item in front of the pusher into the bag.

References Cited
UNITED STATES PATENTS

| | | | |
|---|---|---|---|
| 2,907,160 | 10/1959 | Friedman et al. | 53—385 X |
| 3,165,870 | 1/1965 | Saumsiegle et al. | 53—385 X |
| 3,206,913 | 9/1965 | Fleigher et al. | 53—189 |
| 3,451,192 | 6/1969 | Irwin | 53—385 |

THERON E. CONDON, Primary Examiner

E. F. DESMOND, Assistant Examiner

U.S. Cl. X.R.

53—59, 189, 385